(12) United States Patent
Trenne et al.

(10) Patent No.: US 11,059,362 B2
(45) Date of Patent: Jul. 13, 2021

(54) MODULAR ROLLING CHASSIS FOR A VEHICLE

(71) Applicant: Electrameccanica Vehicles Corp., Vancouver (CA)

(72) Inventors: Rodney J. Trenne, Shelby Township, MI (US); Richard Winston Hoyle, Clarkston, MI (US); Henry Richard Reisner, North Vancouver (CA); Edward Russell Theobald, Surrey (CA); Jerry Kroll, Vancouver (CA)

(73) Assignee: ELECTRAMECCANICA VEHICLES CORP., Vancouver (CA)

( * ) Notice: Subject to any disclaimer, the term of this patent is extended or adjusted under 35 U.S.C. 154(b) by 66 days.

(21) Appl. No.: 16/303,003

(22) PCT Filed: May 19, 2017

(86) PCT No.: PCT/CA2017/050607
§ 371 (c)(1),
(2) Date: Nov. 19, 2018

(87) PCT Pub. No.: WO2017/201613
PCT Pub. Date: Nov. 30, 2017

(65) Prior Publication Data
US 2019/0291559 A1 Sep. 26, 2019

Related U.S. Application Data

(60) Provisional application No. 62/341,748, filed on May 26, 2016.

(51) Int. Cl.
*B60K 1/00* (2006.01)
*B60K 1/04* (2019.01)
(Continued)

(52) U.S. Cl.
CPC ........... *B60K 1/04* (2013.01); *B60H 1/00507* (2013.01); *B60L 50/66* (2019.02); *B62D 21/10* (2013.01);
(Continued)

(58) Field of Classification Search
CPC .............. B60K 1/04; B60K 2001/0438; B60K 2001/005; B60L 50/66; B60H 1/00507;
(Continued)

(56) References Cited

U.S. PATENT DOCUMENTS 4,216,839 A * 8/1980 Gould .................... B60L 3/0015
180/65.1
5,641,031 A * 6/1997 Riemer ................ H01M 2/1083
429/423
(Continued)

FOREIGN PATENT DOCUMENTS

CN 103359233 A 10/2013
CN 103707928 A 4/2014
(Continued)

OTHER PUBLICATIONS

International Search Report and Written Opinion dated Aug. 18, 2017 for related application No. PCT/CA2017/050607.

*Primary Examiner* — Toan C To
(74) *Attorney, Agent, or Firm* — D'Ambrosio & Menon, PLLC; Usha Menon

(57) ABSTRACT

The present invention relates to a modular way to build a rolling chassis using composite materials without custom forming, and yielding appropriate weight distribution (centre of gravity) and torsional and bending rigidity.

23 Claims, 8 Drawing Sheets

(51) Int. Cl.
| | |
|---|---|
| *B62D 61/06* | (2006.01) |
| *B60H 1/00* | (2006.01) |
| *B60L 50/60* | (2019.01) |
| *B62K 25/28* | (2006.01) |
| *B62K 5/027* | (2013.01) |
| *B62K 5/05* | (2013.01) |
| *B62K 5/08* | (2006.01) |
| *B62K 25/04* | (2006.01) |
| *B62K 23/02* | (2006.01) |
| *B62K 5/06* | (2006.01) |
| *B62D 29/00* | (2006.01) |
| *B62D 21/12* | (2006.01) |
| *B62D 21/10* | (2006.01) |

(52) U.S. Cl.
CPC ........... *B62D 21/12* (2013.01); *B62D 29/001* (2013.01); *B62D 61/065* (2013.01); *B62K 5/027* (2013.01); *B62K 5/05* (2013.01); *B62K 5/06* (2013.01); *B62K 5/08* (2013.01); *B62K 23/02* (2013.01); *B62K 25/04* (2013.01); *B62K 25/28* (2013.01); *B60K 2001/005* (2013.01); *B60K 2001/0438* (2013.01)

(58) Field of Classification Search
CPC .... B62D 21/10; B62D 29/001; B62D 61/065; B62D 21/01; B62K 5/027; B62K 25/28; B62K 25/04; B62K 5/06; B62K 5/08; B62K 23/02
See application file for complete search history.

(56) References Cited

U.S. PATENT DOCUMENTS

| | | | |
|---|---|---|---|
| 5,833,023 | A | 11/1998 | Shimizu |
| 6,923,282 | B2 * | 8/2005 | Chernoff ................. B60K 1/00 180/65.22 |
| 7,270,202 | B2 * | 9/2007 | Kondo ..................... B60K 1/00 180/65.1 |
| 8,517,423 | B1 * | 8/2013 | Huston ................ B62D 23/005 280/785 |
| 8,770,331 | B2 | 7/2014 | Lim et al. |
| 2004/0060750 | A1 | 4/2004 | Chernoff |
| 2006/0070790 | A1 | 4/2006 | Kejha |
| 2013/0140101 | A1 | 6/2013 | Lim et al. |
| 2016/0137229 | A1 | 5/2016 | Nishida et al. |
| 2016/0207418 | A1 * | 7/2016 | Bergstrom ............... B60K 1/00 |
| 2020/0017147 | A1 * | 1/2020 | Caliskan ................ B62D 24/00 |

FOREIGN PATENT DOCUMENTS

| | | |
|---|---|---|
| DE | 102009048573 A1 | 4/2011 |
| DE | 1020090048573 A1 | 4/2011 |
| EP | 3323652 A1 | 5/2018 |
| FI | 20110208 A1 | 3/2013 |
| JP | H04500344 A | 1/1992 |
| JP | 2005100841 A | 4/2005 |
| JP | 2014094444 A | 5/2014 |
| WO | 20080151087 A2 | 12/2008 |
| WO | 2009017533 A1 | 2/2009 |

* cited by examiner

MODULAR ROLLING CHASSIS FOR A VEHICLE

CROSS REFERENCE TO RELATED APPLICATION

The present application claims the benefits, under 35 U.S.C. § 119(e), of U.S. Provisional Application Ser. No. 62/341,781 filed May 26, 2016 entitled "Modular Rolling Chassis for a Vehicle", which is incorporated herein by this reference.

BACKGROUND OF THE INVENTION

Field

The present invention relates to a modular rolling chassis for a vehicle.

Description of Related Art

The design and manufacturing of vehicles can be a complex process. Efficiencies can be achieved through modular construction, which allows each module to be refined and manufactured where most cost-effective, after which the modules can be finally assembled together.

For lightweight yet robust vehicles, for example electric vehicles, composites can be a desirable material choice; however, they can be demanding to form into custom parts, particularly for lower volume manufacturing. Such lightweight vehicles can require particular attention to weight distribution (centre of gravity) and to torsional and bending rigidity.

Accordingly, what is needed is a modular way to build a rolling chassis using composite materials without custom forming, and yielding appropriate weight distribution (centre of gravity) and torsional and bending rigidity.

SUMMARY

The present invention is directed to this need.

According to one aspect of the present invention, there is provided a vehicle chassis having a platform frame with a front bulkhead and a rear bulkhead, a front subframe mountable to the front bulkhead, a rear subframe mountable to the rear bulkhead, and a controls module operatively coupleable to the front subframe through the front bulkhead, wherein the platform frame further includes a pair of lateral battery compartments extending from the front bulkhead to the rear bulkhead, and adapted to removably receive a battery module for electrical connection to at least one of the rear subframe and the front subframe.

The platform frame may be constructed from composite panels.

The platform frame may include a cockpit portion between the pair of lateral battery compartments, the pair of lateral battery compartments may have at least one cooling intake and at least one cooling exhaust, and the at least one cooling intake may be connected to receive air from the cockpit portion. The cockpit portion may form a structural support member.

The at least one cooling intake may be located proximate the front bulkhead and the at least one cooling exhaust located proximate the rear bulkhead, the at least one cooling exhaust perhaps including an exhaust fan, such that air received at the cooling intake flows rearward through the pair of lateral battery compartments and is exhausted proximate the rear bulkhead. In this regard, but for the at least one cooling intake, the pair of lateral battery compartments would be thermally sealed from the cockpit portion. The air received from the cockpit portion might have been climate controlled in the cockpit portion.

The chassis may further include a battery module, having a pair of elongated trays adapted to be removably received within the pair of lateral battery compartments of the platform frame, and a plurality of batteries, connected together in an electrical circuit as a source of power, supported on the pair of elongated trays. At least one of or in combination the pair of elongated trays and the plurality of batteries may form a structural support member.

The rear subframe may support: a motor controller, electrically connectable to receive power from a battery module received within the lateral battery compartments, a motor, electrically connected to the motor controller, a swingarm, a drive wheel depending from the swing arm, and a drivetrain coupling the motor to the drive wheel. The motor controller may further be electrically connectable to the controls module. The rear subframe may further support a cooling duct between the motor and the motor controller, to conduct air propelled by the motor to the motor controller for cooling.

The front subframe may support: an independent suspension, a pair of freewheeling hubs at opposite ends of the independent suspension, each of the hubs being adapted to retain a leading wheel, and a steering linkage operatively connected to the hubs.

In some cases, the controls module may include a steering column, the steering linkage may include a single, central universal joint, and the steering column may be operatively coupleable to the steering linkage through the universal joint. The steering column may be mounted to a column support bracket and the column support bracket may be mountable to the front bulkhead to form a structural support member.

In some cases, at least one of or a combination of the front bulkhead, the rear bulkhead and the pair of lateral battery compartments extending therebetween may form a structural support member.

In some cases at least one of or a combination of the front subframe and the rear subframe may form a structural support member.

Further aspects and advantages of the present invention will become apparent upon considering the following drawings, description, and claims.

DESCRIPTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

DETAILED DESCRIPTION OF SPECIFIC EMBODIMENTS

(a) Structure of Specific Embodiments

Figure 1:
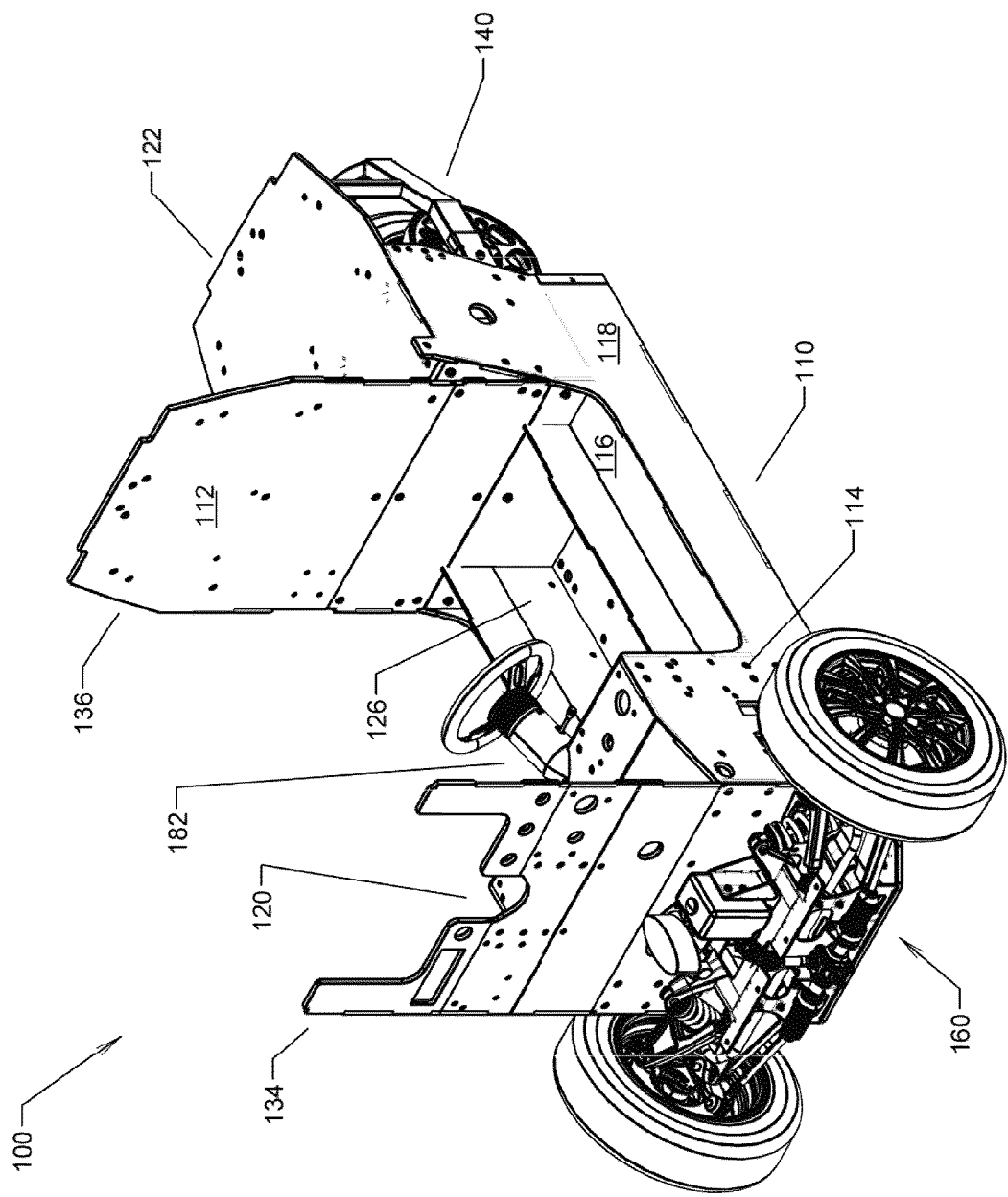
FIG. 1 is a top front right oblique view of an embodiment of a rolling chassis according to aspects of the present invention.
Figure 2:
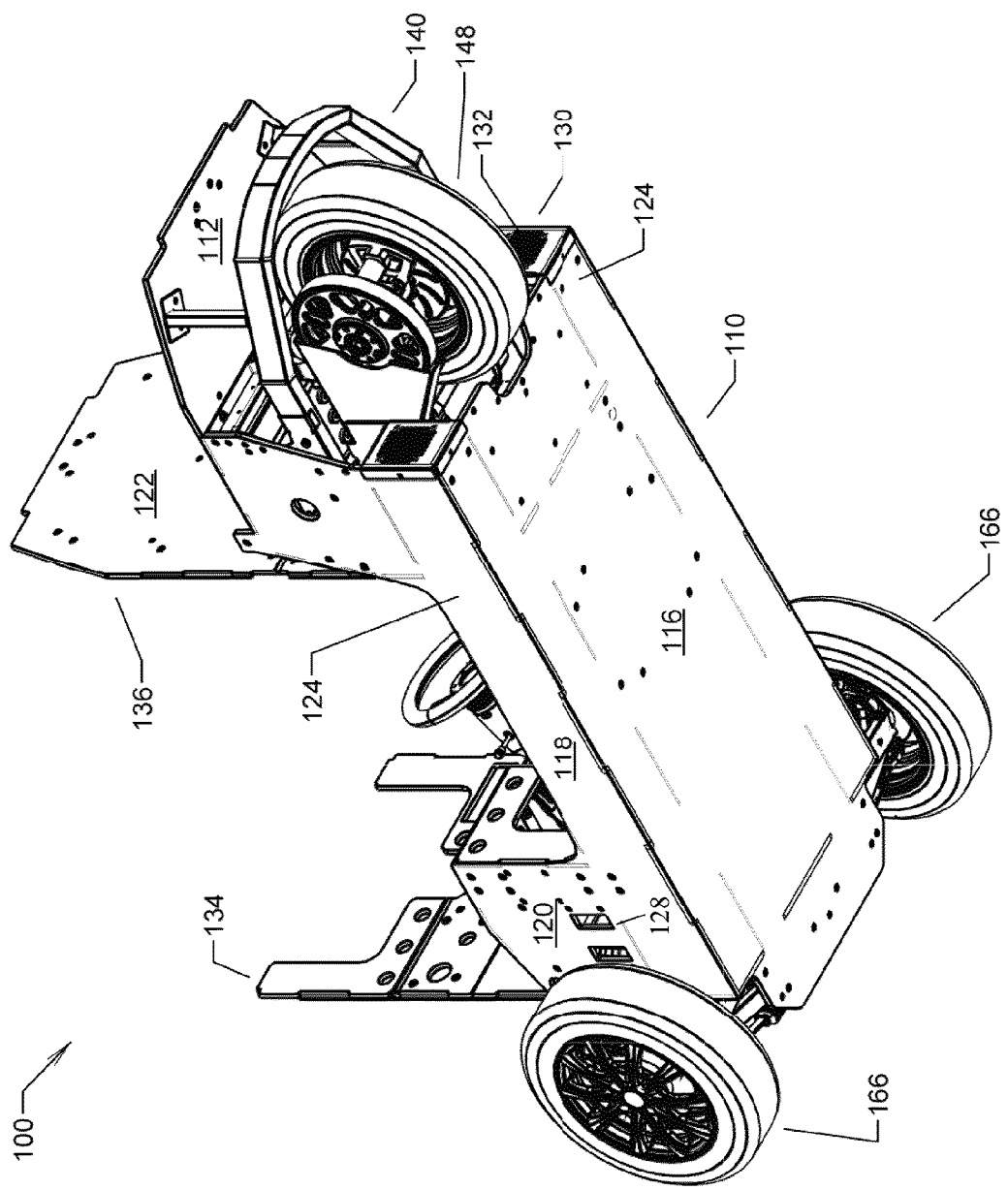
FIG. 2 is a bottom, rear, right oblique view of the embodiment of FIG. 1.
Figure 3:
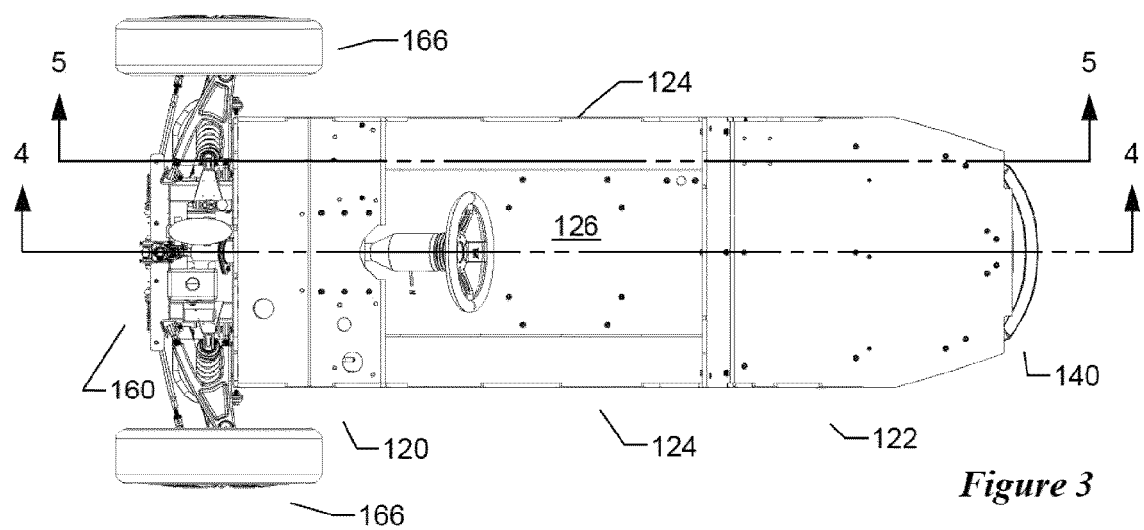
FIG. 3 is a top plan view of the embodiment of FIG. 1.
Figure 4:
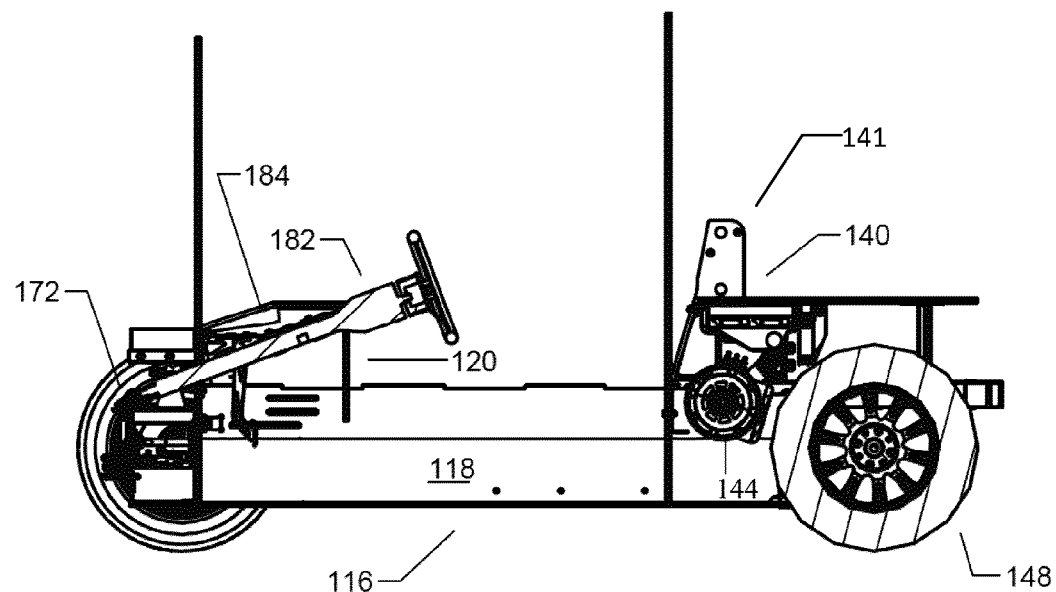
FIG. 4 is a longitudinal section view of the embodiment of FIG. 1, viewed from the cutting plane 4-4 shown on FIG. 3.
Figure 5:
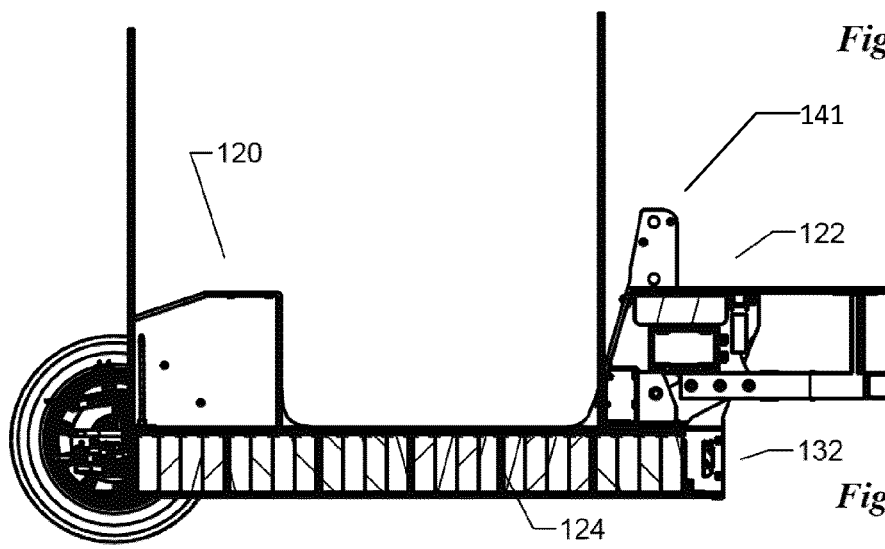
FIG. 5 is a longitudinal section view of the embodiment of FIG. 1, viewed from the cutting plane 5-5 shown on FIG. 3.

The structure of the invention will now be illustrated by explanation of specific, non-limiting, exemplary embodiments shown in the drawing figures and described in greater detail herein.

FIGS. 1-18 show a modular rolling chassis for a vehicle, according to one embodiment of the present invention, generally illustrated at 100.

The chassis is formed on a platform frame 110, and further includes a rear subframe 140, a front subframe 160 and a controls module 180.

It has been found that composite panels, formed for example as fiberglass skin over an aluminum honeycomb core, are a suitable material in the manufacture of portions of the chassis 100, as will be described further below. Panel core might also be formed from Nomex™ (a meta-aramid polymer), foam, titanium, plastic or wood, for example. Panel skins might also be formed from carbon fibre, Kevlar™, (a para-aramid synthetic fibre), aluminum, titanium, steel, stainless steel, or wood, for example. In addition, biocomposites (for example with flax or hemp fibres), recycled carbon fibre, and recycled glass fibre might be incorporated into such panels used for these applications.

Such composite panels provide strength in tension and compression, while permitting bending and folding; they can be formed by casting, cutting and more generally machining, to achieve desired sizes, shapes, configurations and characteristics. In this regard, such panels can be readily available in standard sizes and other properties, or custom manufactured to specification.

The careful deployment of such composite panels can yield a chassis 100 that is an order of magnitude lighter than a traditional steel chassis. An analogy can be drawn to a pizza box formed from a sheet of corrugated fiberboard that is cut to shape and then folded into a three-dimensional box.

As illustrated, the platform frame 110 may be formed from readily available or manufactured composite panels 112, cut or otherwise formed to the desired size and shape, connected together by fasteners 114 (detailed in FIGS. 12-18), for example, as illustrated, fasteners commonly used in aerospace manufacturing, or adhesives or welds for example.

The platform frame 110 is formed as a platform 116 supporting a plurality of longitudinal joists 118 fastened thereto, and to both of which are fastened a front bulkhead 120 and a rear bulkhead 122. The platform frame 110 further includes a pair of lateral battery compartments 124 extending from the front bulkhead to the rear bulkhead, and adapted to removably receive a battery module 200 for electrical connection to at least one of the rear subframe 140 and the front subframe 160. The platform frame 110 further includes a cockpit portion 126 between the pair of lateral battery compartments 124; the cockpit portion 126 may form a structural support member of the platform frame 110, providing additional torsional and bending stiffness to the chassis 100.

The front bulkhead 120, the rear bulkhead 122 and the pair of lateral battery compartments 124 extending therebetween may individually or in combination form a structural support member of the platform frame, providing additional torsional and bending stiffness to the chassis 100.

The pair of lateral battery compartments 124 has at least one cooling intake (not shown) and at least one cooling exhaust 130, the cooling intake being connected to receive air from the cockpit portion 126, for example climate controlled air. The cooling intake may be located proximate the front bulkhead 120 and the cooling exhaust 130 located proximate the rear bulkhead 122, such that air received at the cooling intake may flow rearward through the pair of lateral battery compartments 124 and be exhausted proximate the rear bulkhead 122; in this regard, the cooling exhaust 130 may include an exhaust fan 132. But for the cooling intake, the pair of lateral battery compartments 124 may be thermally sealed from the cockpit portion 126, such that the battery module 200 does not itself need to be sealed from the ambient environment.

The battery module 200 includes a pair of elongated trays 202 adapted to be removably received within the pair of lateral battery compartments 124 of the platform frame 110 and a number of batteries 204, connected together in an electrical circuit as a source of power, supported on the pair of elongated trays. The trays 202 and the batteries 204 may on their own or in combination form a structural support member, providing additional torsional and bending stiffness to the chassis 100. The heavy batteries 204 (and the relatively light composite panels 112) also lower the centre of gravity of the chassis 100.

Those skilled in the art will recognize that the battery module 200 could have electrical contacts 206 for ready electrical connection to at least one of the rear subframe 140 and the front subframe 160, for example contacts 206 on the pair of elongated trays 202. Those skilled in the art will further recognize that the battery module 200 may further include mounting hardware 208, for example straps, for retaining the batteries 204 in the pair of elongated trays 202.

The front bulkhead 120 may support a windscreen frame 134 and the rear bulkhead 122 may support a roof panel 136 that is foldable to connect to the windscreen frame 134 to enclose the cockpit portion 126.

The rear subframe 140 is mountable to the rear bulkhead 122 and can support components such as a motor controller 142 electrically connectable to receive power from a battery module 200, a motor 144, electrically connected to the motor controller 142, a swing arm 146 which may be a swing arm as disclosed in co-pending International application PCT/CA2017/050321 filed 10 Mar. 2017, which is incorporated herein by reference, a drive wheel 148 depending from the swing arm 146, and a drivetrain 150 coupling the motor 144 to the drive wheel 148. The motor controller 142 may be electrically connectable to the controls module 180 such that a user may use the controls module 180 to direct the motor controller 142. The motor controller 142 is mounted to the sub-frame 140 just above the motor 144. It regulates the torque/power going the motor 144 to control speed and acceleration of the vehicle. The rear subframe 140 can form a structural support member, providing additional torsional and bending stiffness to the chassis 100. A metal sub-frame 141 used to mount the seat belt D-ring is supported on rear subframe 140.

The rear subframe 140 may further support a cooling duct 152 between the motor 144 and the motor controller 142, to conduct air propelled by the motor 144 to the motor controller 142 for cooling. Cooling duct 152 is a small duct connecting the motor controller 142 to the motor. The motor 144 draws air over the motor controller 142 via cooling duct 152.

The rear subframe 140 may be formed from readily available or manufactured composite panels 112, cut or otherwise formed to the desired size and shape, connected together by fasteners 114 or welds for example.

Figure 7:
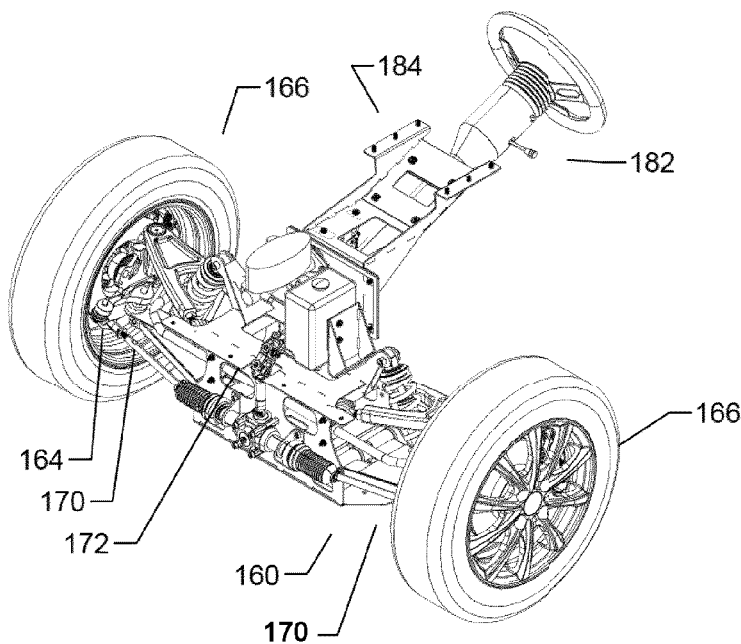
FIG. 7 is a top front right oblique view of the front subframe and the controls module shown in FIG. 6.
Figure 6:
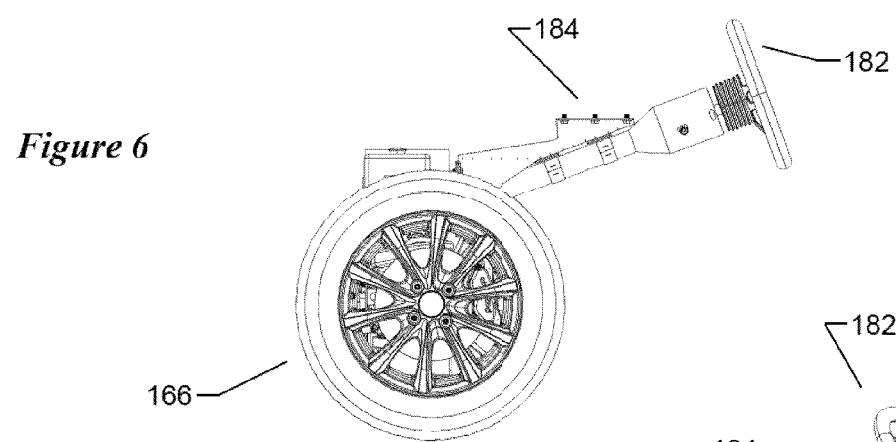
FIG. 6 is a right elevation detail view of a front subframe and a controls module of the embodiment of FIG. 1.
Figure 8:
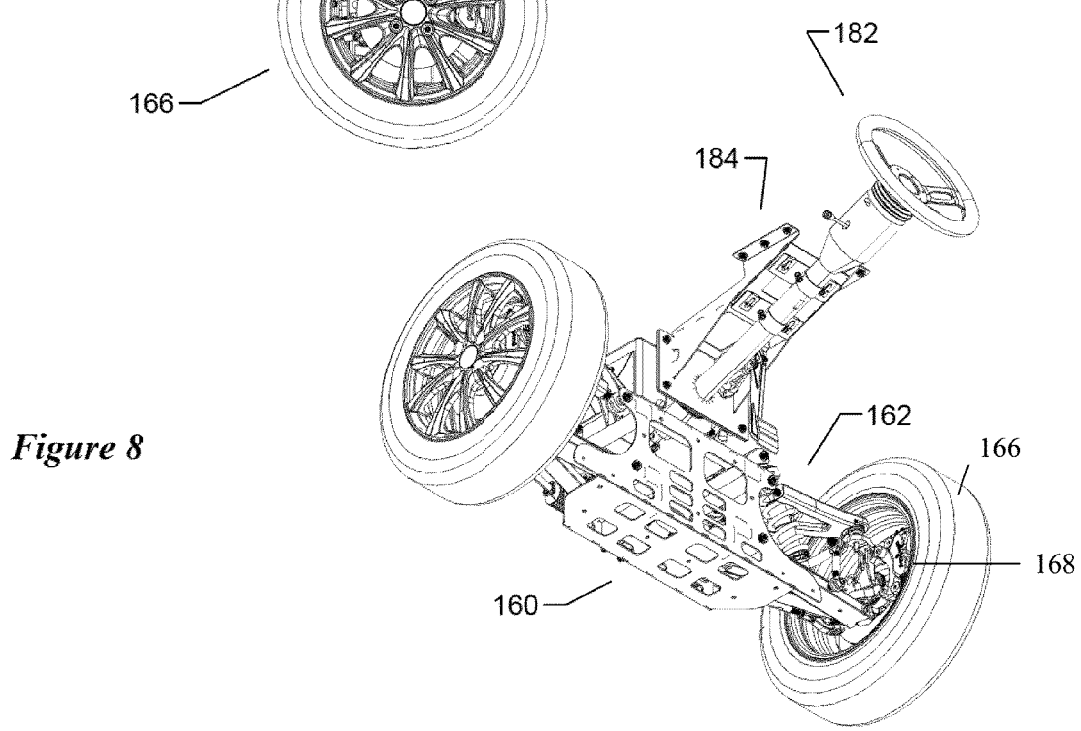
FIG. 8 is a bottom, rear, right oblique view of the front subframe and the controls module shown in FIG. 6.
Figure 9:
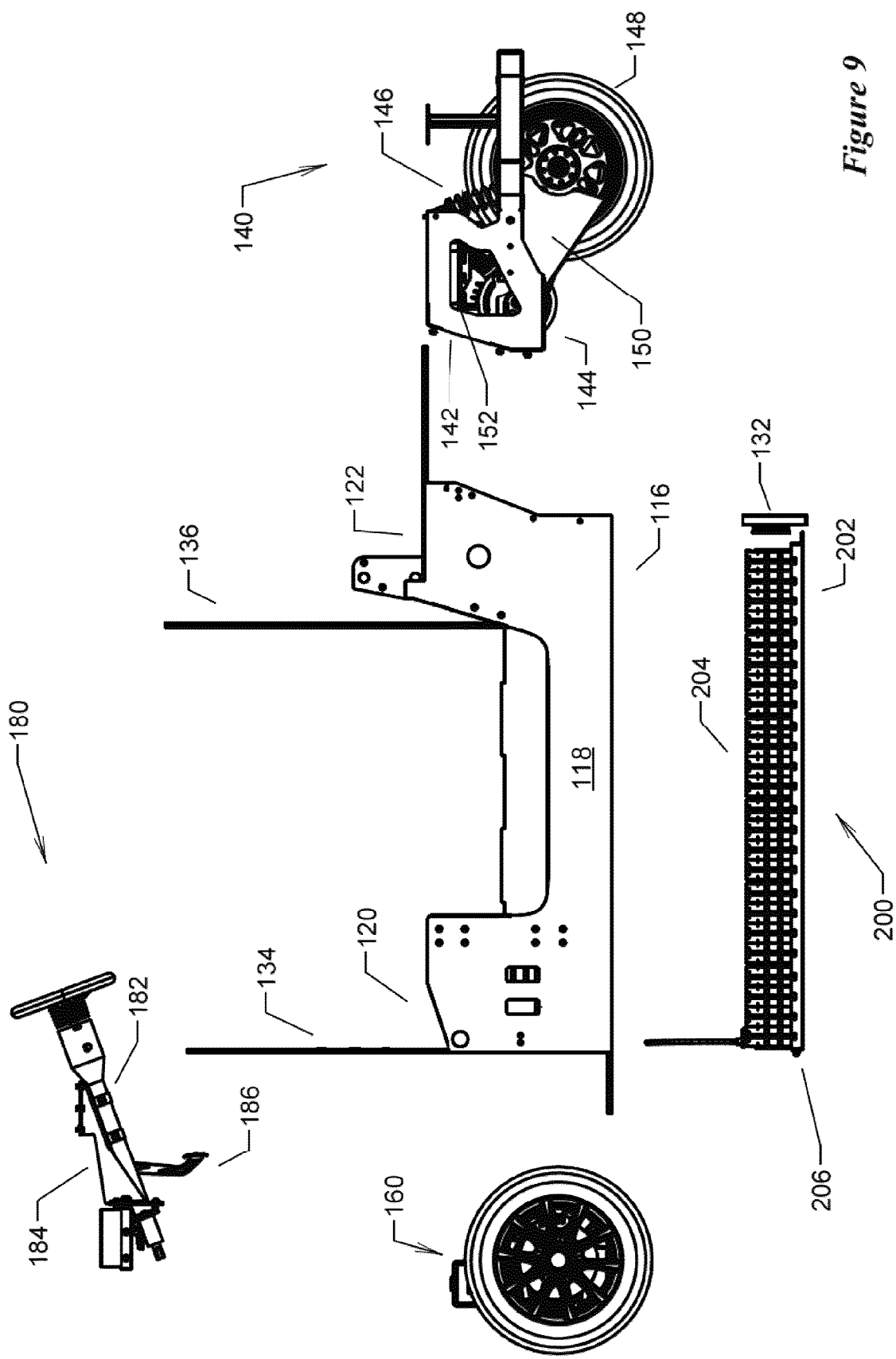
FIG. 9 is an exploded right elevation view of the embodiment of FIG. 1.
Figure 10:
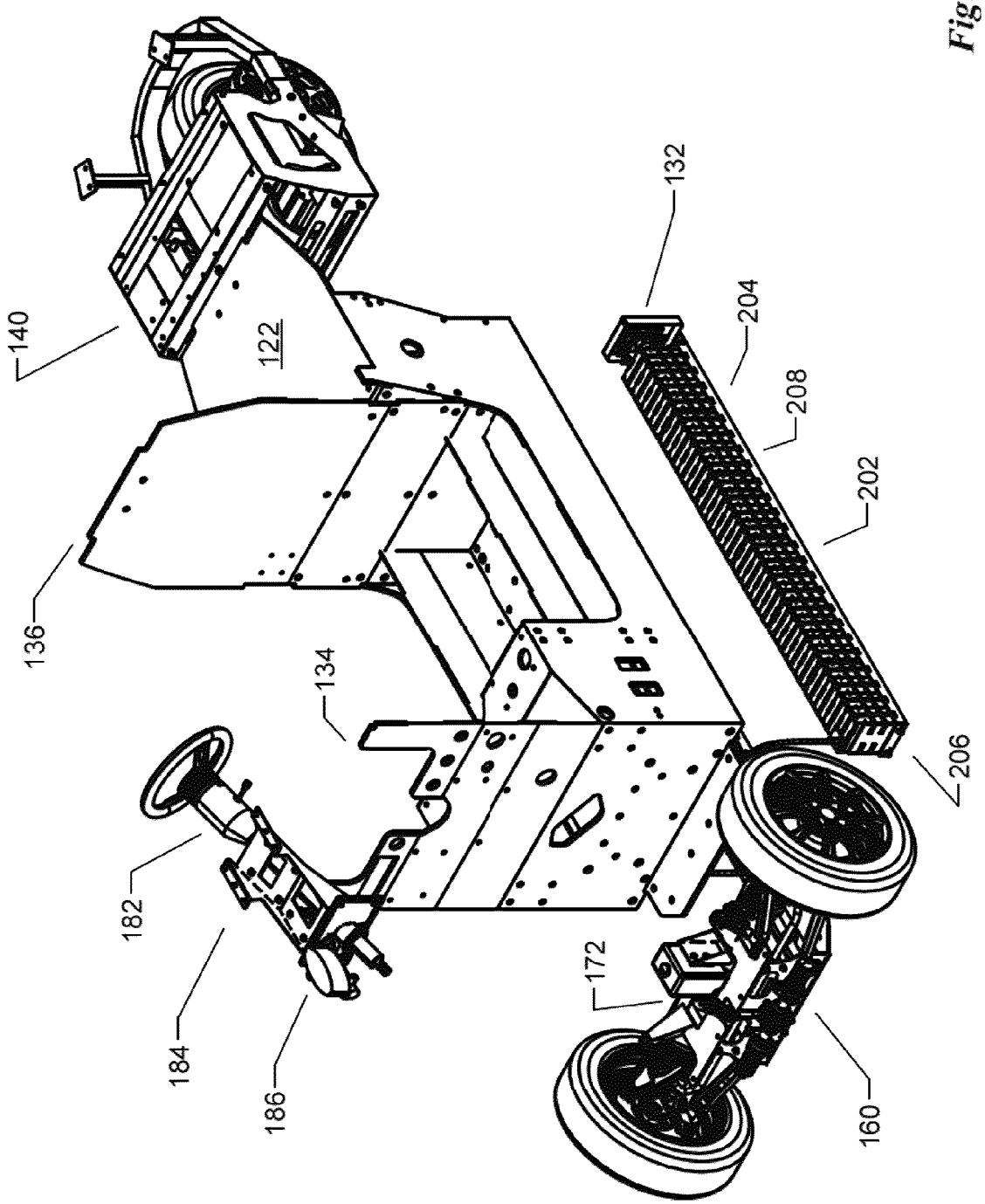
FIG. 10 is an exploded top front right oblique view of the embodiment of FIG. 1.
Figure 11:
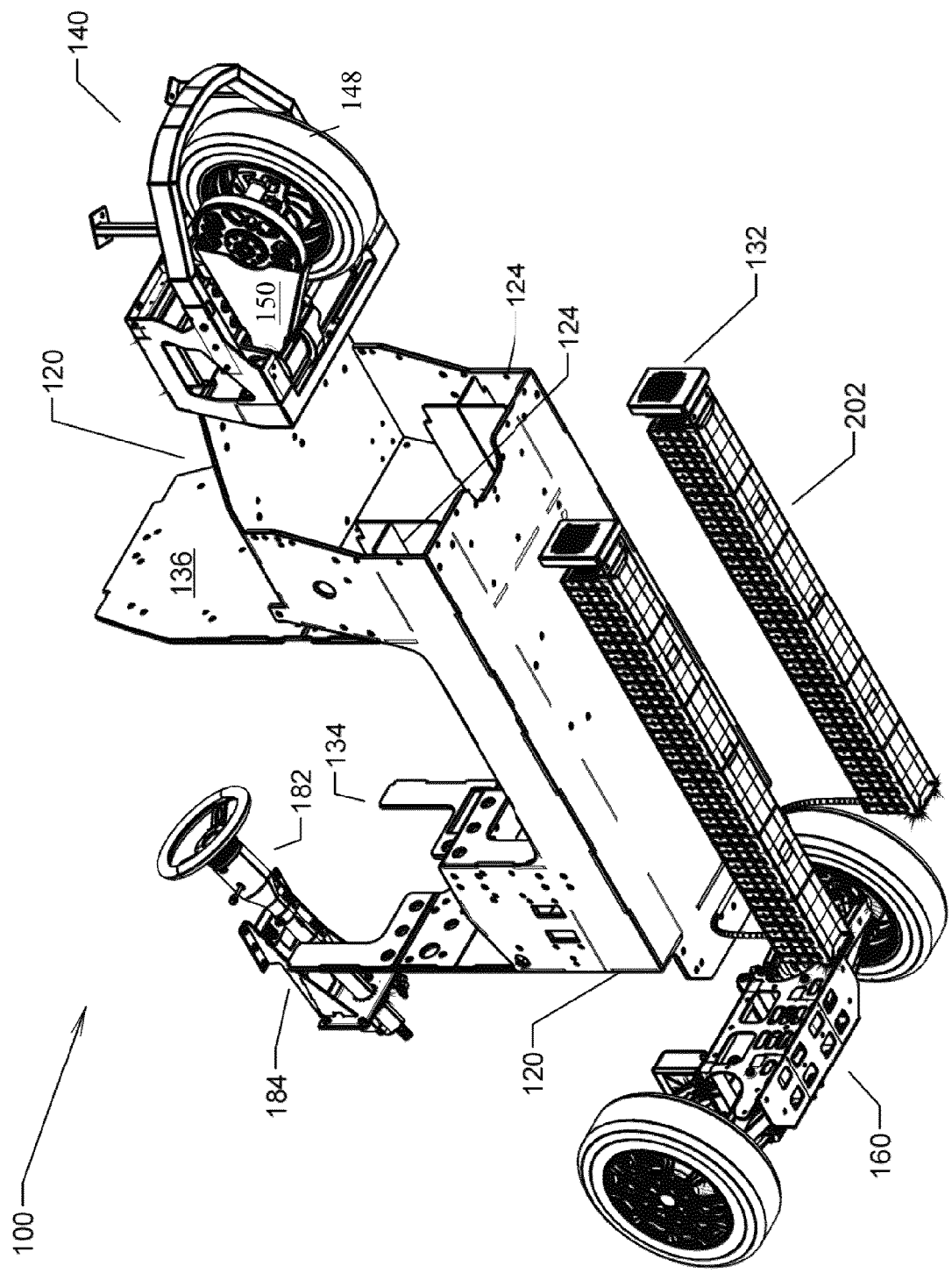
FIG. 11 is an exploded bottom, rear, right oblique view of the embodiment of FIG. 1.
Figure 15:
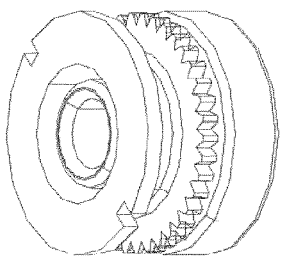
FIG. 15 is a top, front, right oblique detail view of the fastener shown in FIG. 12.
Figure 13:
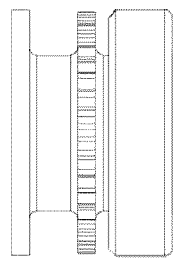
FIG. 13 is a right elevation detail view of the fastener shown in FIG. 12.
Figure 17:
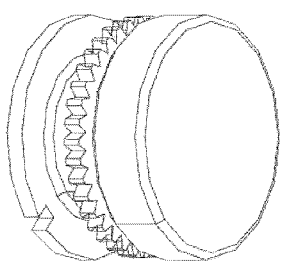
FIG. 17 is a bottom, front, right oblique detail view of the fastener shown in FIG. 12.
Figure 14:
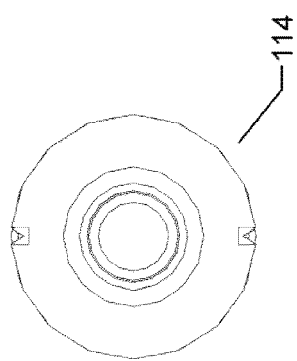
FIG. 14 is a top plan detail view of the fastener shown in FIG. 12.
Figure 12:
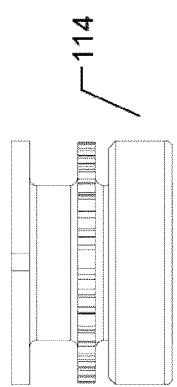
FIG. 12 is a front elevation detail view of a fastener for fastening composite panels in the embodiment of FIG. 1.
Figure 16:
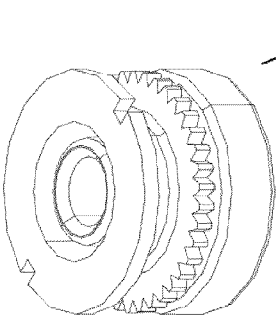
FIG. 16 is a top, front, left oblique detail view of the fastener shown in FIG. 12.
Figure 18:
FIG. 18 is a bottom, front, left oblique detail view of the fastener shown in FIG. 12.

With additional detail shown in FIGS. 6-8, the front subframe 160 is mountable to the front bulkhead 120 and can support components such as an independent suspension 162, a pair of freewheeling hubs 164 at opposite ends of the independent suspension 162, each of the hubs 164 being adapted to retain a leading wheel 166, and a steering linkage 170 operatively connected to the hubs 164, and a braking system 168 operatively connected to the hubs 164. The steering linkage 170 may include a single, central universal joint 172. The front subframe 160 can form a structural support member, providing additional torsional and bending stiffness to the chassis 100.

The front subframe 160 may be formed from readily available or manufactured composite panels 112, cut or otherwise formed to the desired size and shape, connected together by fasteners 114 or welds for example.

The controls module 180 includes a steering column 182 and a column support bracket 184 to which the steering column 182 can be mounted. The column support bracket 184 is mountable to the front bulkhead 120 to form a structural support member, in place of a cross-car beam, for example. The steering column 182 is operatively coupleable to the steering linkage 170 through the universal joint 172. The controls module 180 may include other controls, for example a brake controller 186 operatively coupleable to the braking system 168.

(b) Operation of Specific Embodiments

With reference now to FIGS. 1-18, the assembly of the rolling chassis 100 will now be described.

The platform frame 110 may be manufactured from composite panels 112 and fasteners 114, instead of more demanding custom-formed composite pieces. The composite panel 112 need merely be cut to size and shape and drilled as needed and then easily assembled together into a platform frame 110 by simple fastening operations.

The battery module 200 may be manufactured elsewhere and delivered for subsequent assembly into the rolling chassis 100. Similarly, for maintenance, an expired battery module 200 may be easily removed rearwardly from the battery compartment 124 and a replacement battery module 200 inserted in its place. In this regard, batteries 204 would be wired together as appropriate and supported onto the pair of elongated trays 202. The batteries 204 could be further retained in the pair of elongated trays 202 with mounting hardware 208. The battery module 200 may be placed in electrical connection with at least one of the rear subframe 140 and the front subframe 160 via contacts 206.

The rear subframe 140 and the front subframe 160, and their supported components, could similarly be manufactured elsewhere and delivered for subsequent assembly into the rolling chassis 100. As with the battery module 200, such modular assembly may also be advantageous for maintenance or repair. The rear subframe 140 and the front subframe 160 can be simply fastened to the rear bulkhead 122 and front bulkhead 120 respectively, composite panel 112 to composite panel 112, with fasteners 114. Fasteners 114 are standard panel fasteners such as the threaded inserts manufactured by Witten Company, Inc. which are potted into place.

The controls module 180 could similarly be manufactured elsewhere and delivered for subsequent assembly into the rolling chassis 100. As with the battery module 200, the rear subframe 140 and the front subframe 160, such modular assembly may also be advantageous for maintenance or repair. For assembly, the column support bracket 184 can be mounted to the front bulkhead 120 to form a structural support member and the steering column 182 can be operatively coupled to the steering linkage 170 through the universal joint 172. Similarly, other controls, such as the brake controller 186 can be operatively coupled, for example to the braking system 168.

This modular manufacturing and subsequent assembly encourages parallel production and module-level encapsulation, optimization and testing.

(c) Description Summary

Thus, it will be seen from the foregoing embodiments and examples that there has been described a modular way to build a rolling chassis using composite materials without custom forming, and yielding appropriate weight distribution (centre of gravity) and torsional and bending rigidity.

While specific embodiments of the invention have been described and illustrated, such embodiments should be considered illustrative of the invention only and not as limiting the invention as construed in accordance with the accompanying claims.

It will be understood by those skilled in the art that various changes, modifications and substitutions can be made to the foregoing embodiments without departing from the principle and scope of the invention expressed in the claims made herein.

What is claimed is:

1. A vehicle chassis apparatus, comprising:
  a. a platform frame having:
    i. a front bulkhead, ii. a rear bulkhead, and
iii. a central cockpit portion extending longitudinally in between the front and rear bulkheads,
b. a front subframe mountable to the front bulkhead,
c. a rear subframe mountable to the rear bulkhead, and
d. a controls module operatively coupleable to the front subframe through the front bulkhead,
wherein the platform frame further includes a pair of lateral battery compartments respectively located at each outboard side of the central cockpit portion and extending longitudinally from the front bulkhead to the rear bulkhead, and adapted to removably receive a battery module for electrical connection to at least one of the rear subframe and the front subframe,
wherein the rear subframe supports:
a. a motor controller, electrically connectable to receive power from a battery module received within the lateral battery compartments,
b. a motor, electrically connected to the motor controller,
c. a swingarm,
d. a drive wheel depending from the swing arm, and
e. a drivetrain coupling the motor to the drive wheel.

2. The apparatus as claimed in claim 1, wherein:
the pair of lateral battery compartments have at least one cooling intake and at least one cooling exhaust, and
the at least one cooling intake is connected to receive air from the cockpit portion.

3. The apparatus as claimed in claim 2, wherein the cockpit portion forms a structural support member.

4. The apparatus as claimed in claim 2, wherein:
the at least one cooling intake is located proximate the front bulkhead, and
the at least one cooling exhaust is located proximate the rear bulkhead,
whereby air received at the cooling intake flows rearward through the pair of lateral battery compartments and is exhausted proximate the rear bulkhead.

5. The apparatus as claimed in claim 4, wherein, but for the at least one cooling intake, the pair of lateral battery compartments are thermally sealed from the cockpit portion.

6. The apparatus as claimed in claim 5, wherein the air received from the cockpit portion had been climate controlled.

7. The apparatus as claimed in claim 5, wherein the cooling exhaust includes an exhaust fan.

8. The apparatus as claimed in claim 1, further including a battery module, comprising:
a. a pair of elongated trays adapted to be removably received within the pair of lateral battery compartments of the platform frame, and
b. a plurality of batteries, connected together in an electrical circuit as a source of power, supported on the pair of elongated trays.

9. The apparatus as claimed in claim 8, wherein at least one of or in combination the pair of elongated trays and the plurality of batteries form a structural support member.

10. The apparatus as claimed in claim 1, wherein the motor controller is further electrically connectable to the controls module.

11. The apparatus as claimed in claim 1, wherein the rear subframe further supports a cooling duct between the motor and the motor controller, to conduct air propelled by the motor to the motor controller for cooling.

12. The apparatus as claimed in claim 1, wherein the front subframe supports:

a. an independent suspension,
b. a pair of freewheeling hubs at opposite ends of the independent suspension, each of the hubs being adapted to retain a leading wheel, and
c. a steering linkage operatively connected to the hubs.

13. The apparatus as claimed in claim 12, wherein:
a. the controls module includes a steering column,
b. the steering linkage supported by the front subframe includes a single, central universal joint, and
c. the steering column is operatively coupleable to the steering linkage through the universal joint.

14. The apparatus as claimed in claim 13, wherein the steering column is mounted to a column support bracket.

15. The apparatus as claimed in claim 14, wherein the column support bracket is mountable to the front bulkhead to form a structural support member.

16. The apparatus as claimed in claim 1, wherein the platform frame is constructed at least in part from composite panels.

17. The apparatus as claimed in claim 16, wherein at least one of or a combination of the front bulkhead, the rear bulkhead and the pair of lateral battery compartments extending therebetween form a structural support member.

18. The apparatus as claimed in claim 16, wherein at least one of or a combination of the front subframe and the rear subframe form a structural support member.

19. The apparatus as claimed in claim 16, wherein said composite panels comprise a panel skin covering a panel core.

20. A vehicle chassis apparatus, comprising:
a. a platform frame having:
i. a front bulkhead,
ii. a rear bulkhead, and
iii. a central cockpit portion extending longitudinally in between the front and rear bulkheads,
b. a front subframe mountable to the front bulkhead,
c. a rear subframe mountable to the rear bulkhead, and
d. a controls module operatively coupleable to the front subframe through the front bulkhead,
wherein the platform frame further includes a pair of lateral battery compartments respectively located at each outboard side of the central cockpit portion and extending longitudinally from the front bulkhead to the rear bulkhead, and adapted to removably receive a battery module for electrical connection to at least one of the rear subframe and the front subframe,
wherein the front subframe supports:
a. an independent suspension,
b. a pair of freewheeling hubs at opposite ends of the independent suspension, each of the hubs being adapted to retain a leading wheel, and
c. a steering linkage operatively connected to the hubs.

21. The apparatus as claimed in claim 20, wherein:
a. the controls module includes a steering column,
b. the steering linkage supported by the front subframe includes a single, central universal joint, and
c. the steering column is operatively coupleable to the steering linkage through the universal joint.

22. The apparatus as claimed in claim 21, wherein the steering column is mounted to a column support bracket.

23. The apparatus as claimed in claim 22, wherein the column support bracket is mountable to the front bulkhead to form a structural support member.

* * * * *